United States Patent
Jung et al.

(10) Patent No.: US 10,142,206 B2
(45) Date of Patent: Nov. 27, 2018

(54) METHOD AND APPARATUS FOR PACKET COMMUNICATION USING HEADER COMPRESSION

(71) Applicant: Samsung Electronics Co., Ltd., Gyeonggi-do (KR)

(72) Inventors: Hyeun-Mok Jung, Gyeonggi-do (KR); Praveen Chebolu, Gyeonggi-do (KR); Shaik Abdulla, Bangalore (IN); Varun Bharadwaj, Bangalore (IN); Ganesh Babu Kamma, Bangalore (IN); Jai-Dong Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 73 days.

(21) Appl. No.: 15/200,455

(22) Filed: Jul. 1, 2016

(65) Prior Publication Data

US 2017/0006496 A1    Jan. 5, 2017

(30) Foreign Application Priority Data

Jul. 3, 2015 (KR) ........................ 10-2015-0095171

(51) Int. Cl.
| | |
|---|---|
| H04W 4/00 | (2018.01) |
| H04L 12/26 | (2006.01) |
| H04L 29/06 | (2006.01) |
| H04L 1/16 | (2006.01) |
| H04W 84/04 | (2009.01) |
| H04W 84/12 | (2009.01) |
| H04J 13/00 | (2011.01) |
| H04W 4/80 | (2018.01) |

(52) U.S. Cl.
CPC .......... *H04L 43/0829* (2013.01); *H04L 69/04* (2013.01); *H04J 13/00* (2013.01); *H04W 4/80* (2018.02); *H04W 84/042* (2013.01); *H04W 84/12* (2013.01)

(58) Field of Classification Search
CPC ........ H04L 69/04; H04W 28/06; H04W 28/24
See application file for complete search history.

(56) References Cited

U.S. PATENT DOCUMENTS

| | | | | |
|---|---|---|---|---|
| 2005/0265284 A1* | 12/2005 | Hsu | ....................... | H04W 28/06 370/331 |
| 2006/0222010 A1* | 10/2006 | Bosch | ................... | H04L 1/1854 370/469 |
| 2010/0034187 A1 | 2/2010 | Kumar et al. | | |
| 2012/0106413 A1* | 5/2012 | Huang | .................. | H04L 1/0079 370/310 |
| 2012/0189023 A1* | 7/2012 | Huang | .................. | H04L 1/0006 370/477 |
| 2013/0114497 A1* | 5/2013 | Zhang | ................. | H04W 72/005 370/312 |
| 2015/0256653 A1* | 9/2015 | Ambriss | ................. | H04L 69/04 370/235 |

(Continued)

*Primary Examiner* — Charles C Jiang
*Assistant Examiner* — Will W Lin
(74) *Attorney, Agent, or Firm* — The Farrell Law Firm, P.C.

(57) ABSTRACT

Disclosed are a method and apparatus for packet communication using header compression. The method includes applying a header compression protocol to generate a packet to be transmitted, determining whether the packet is dropped in a transport layer, and transmitting, if it is determined that the packet is dropped, a full packet having an uncompressed header.

13 Claims, 3 Drawing Sheets

(56) References Cited

U.S. PATENT DOCUMENTS

2016/0142518 A1\* 5/2016 Raina .................. H04L 69/04
370/230
2016/0241685 A1\* 8/2016 Shah .................... H04L 69/04
2016/0381598 A1\* 12/2016 Chan ................... H04L 1/1607
370/474

\* cited by examiner

METHOD AND APPARATUS FOR PACKET COMMUNICATION USING HEADER COMPRESSION

PRIORITY

This application claims priority under 35 U.S.C. § 119(a) to Korean Patent Application Serial No. 10-2015-0095171, which was filed in the Korean Intellectual Property Office on Jul. 3, 2015, the entire content of which is incorporated herein by reference.

BACKGROUND

1. Field of the Disclosure

The present disclosure generally relates to a method and apparatus for wireless communication, and more particularly, to a method and apparatus for processing dropped packets which include compressed headers.

2. Description of the Related Art

When internet protocol (IP) technology is applied to a wireless communication protocol, excessive overhead may be generated by packet headers which causes problems such as low transmission rates and high bit error rates on the radio link. For example, in the case of IP version 6 (IPv6) voice communication packets, data packet payload occupies only 22% of the full packet, which may lead to bandwidth inefficiency and high probability of packet discarding due to packet errors. A full packet is an IPv4 or IPv6 packet having an uncompressed header.

In order to overcome these problems, header compression has been developed, with one representative header compression mechanism being robust header compression (ROHC). When data is transmitted on a wireless network, most of the header fields of the transmitted packets in the same stream have the same value. The ROHC mechanism compresses packet headers to use a packet as a reference packet, and include only the difference information between the reference packet and the other packets in the header fields, thereby reducing packet header overhead and achieving more efficient use of bandwidth.

In a mobile communication system such as 3rd generation partnership project long term evolution (3GPP LTE), ROHC may be processed by a compressor and a decompressor in a packet data convergence protocol (PDCP) layer which is one of the layers of a wireless radio communication stack. However, when a header-compressed packet is dropped or missed in the lower layer, the compressor in the PDCP layer cannot recognize the packet drop or miss immediately. Particularly, in a unidirectional (U) mode of ROHC operation, packets are transmitted in a direction from the compressor to the decompressor, and the decompressor does not transmit any feedback to the compressor. Accordingly, when packet drop has occurred, all packets are discarded or deleted until a new reference packet is received, which may lead to call drop.

SUMMARY

The present disclosure addresses at least the above-mentioned problems and/or disadvantages and provides at least the advantages described below. Accordingly, an aspect of the present disclosure is to provide a method and apparatus for packet communication using header compression.

According to an aspect of the present disclosure a method and apparatus is provided for quickly restoring a packet when packet drop occurs in a lower layer.

According to another aspect of the present disclosure a method and apparatus is provided for reporting packet drop occurring in a lower layer to an upper layer that controls processing of header compression.

According to another aspect of the present disclosure a method and apparatus is provided for quickly retransmitting a reference packet when packet drop occurs.

In accordance with an aspect of the present disclosure, a packet communication method using header compression is provided, the method including applying a header compression protocol to generate a packet to be transmitted, determining whether the packet is dropped in a transport layer, and transmitting, if it is determined that the packet is dropped, a full packet having an uncompressed header.

In accordance with another aspect of the present disclosure, a packet communication apparatus is provided which includes a processor configured to apply a header compression protocol to generate a packet to be transmitted, determine whether the packet is dropped in a transport layer, and if it is determined that the packet is dropped, transmit a full packet having an uncompressed header, and a transmitter configured to transmit the full packet to a receiving apparatus.

In accordance with another aspect of the present disclosure, a chipset for controlling a user equipment (UE) in a mobile communication system is provided, the chipset configured to apply a header compression protocol to generate a packet to be transmitted, determine whether the packet is dropped in a transport layer, and if it is determined that the packet is dropped, transmit a full packet having an uncompressed header.

BRIEF DESCRIPTION OF THE DRAWINGS

The above and other aspects, features and advantages of certain embodiments of the present disclosure will be more apparent from the following detailed description taken in conjunction with the accompanying drawings, in which.

Throughout the drawings and specification, like reference numerals will be understood to refer to the same or similar elements, features, and structures.

DETAILED DESCRIPTION

Figure 1:
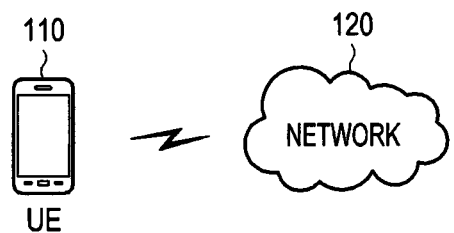
FIG. 1 illustrates a configuration of a mobile communication system, according to an embodiment of the present disclosure.

Hereinafter, embodiments of the present disclosure will be described in detail with reference to the accompanying drawings.

What is well known in the related art in the following description of the embodiments, and the description thereof, will be omitted for technical details that are not related directly to the present disclosure in order to more clearly convey the subject matter of the present disclosure. For the same reason, in the accompanying drawings, some components may be exaggerated, omitted or shown schematically. In addition, the size of each component may not reflect its actual size. The same or corresponding components in the drawings are assigned the same reference numerals.

Advantages and features of the present disclosure, and methods of achieving the advantages and features, will be apparent by referring to embodiments described below in connection with the accompanying drawings. However, the present disclosure is not restricted by these embodiments, and may be implemented in many different forms. The present embodiments are provided to allow those having ordinary skill in the art to understand the scope of the present disclosure.

It will be understood that each block of a flowchart and/or block diagram illustrations, and combinations of blocks in a flowchart and/or block diagram illustrations, may be implemented by computer program instructions and/or hardware operations. These computer program instructions may be provided to a processor of a general purpose computer, a special purpose computer, a chipset, or other programmable data processing apparatus to produce a machine, such that the instructions, which execute via the processor of the computer, chipset or other programmable data processing apparatus, create means and/or circuits for implementing the functions specified in the flowchart and/or block diagram block or blocks.

The computer program instructions may also be stored in a computer usable or computer-readable memory that may direct a computer or other programmable data processing apparatus to function in a particular manner, such that the instructions stored in the computer usable or computer-readable memory produce instructions that implement the function specified in the flowchart and/or block diagram block(s).

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block(s).

In this regard, each block represents a module, segment, or portion of code, which comprises one or more executable instructions for implementing the specified logical function(s). It should also be noted that in other implementations, the function(s) noted in the blocks may occur out of order. For example, two blocks shown in succession may, in fact, be executed substantially concurrently or the blocks may sometimes be executed in the reverse order, depending on the functionality involved.

The term 'unit' refers to software or hardware components such as a field programmable gate array (FPGA) or application-specific integrated circuit (ASIC), and a "unit" performs a function. However, a "unit" is not limited to hardware or software. A "unit" may be configured to be included in a storage medium that may be addressed, or configured to execute on one or more processors or chipsets. Accordingly, as an example, a "unit" includes components such as software components, object-oriented software components, class components, or task components, processes, functions, attributes, procedures, subroutines, segments of a program code, drivers, firmware, micro-codes, circuits, data, databases, data structures, tables, arrays, or variables. Functions provided in components or "units" may be combined into a small number of components or "units", or separated into additional components or "units". Furthermore, the components and "units" may be implemented as one or more CPUs, chipsets or embedded processors in a device or a security multimedia card.

While embodiments of the present disclosure may be applied to Orthogonal Frequency Division Multiplexing (OFDM)-based wireless communication systems, the present disclosure may be also applicable to other communication systems and services having similar technical background.

FIG. 1 illustrates a configuration of a mobile communication system according to an embodiment of the present disclosure. The mobile communication system may be a communication system, such as long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), 4th generation (4G), pre 5th generation (pre-5G), 5th generation (5G), Wi-Fi, bluetooth, near field communication (NFC), and WiFi direct.

Referring to FIG. 1, user equipment (UE) 110 may communicate with a network 120 through a radio link. The radio link may convey packets containing control information, signaling, data traffic, etc. The network 120 may be composed of a node B (NB) (or an evolved node B (ENB) or a base station (BS)) and at least one core network node to transfer packets from the UE 110 to an IP network or packets from the IP network to the UE 110. The radio link between the UE 110 and the network 120 may support hybrid automatic retransmission request (HARQ) in order to satisfy the required quality of service (QoS).

In a mobile communication system such as LTE, all user traffic including a real-time service such as voice over IP (VoIP) may be serviced through a shared channel, and the NB may collect context information of UEs in a cell to perform scheduling. Such LTE-based VoIP is called voice over LTE (VoLTE). VoLTE is an IP multimedia subsystem (IMS)-based VoIP service which provides voice service, that is, VoLTE is a multimedia telephony (MMTel) service.

A VoIP packet may be configured with an Internet protocol/user datagram protocol/real time protocol (IP/UDP/RTP) header and a VoIP frame in order to support transmission of real-time voice traffic through an IP network. The IP/UDP/RTP header may be, for example, compressed down to 1 to 15 bytes through robust header compression (ROHC). The ROHC is a technique for compressing the headers of IP, UDP/TCP, and RTP packets that are transmitted/received during a voice call, and the ROHC may compress packet headers, not packet payloads. An ROHC compression protocol may compress IP/UDP/RTP headers of voice and video RTP traffic, for example, from 40 bytes down to 4 bytes or less. The ROHC may also support compression of IP/UDP, IP/TCP, and IP headers.

Figure 2:
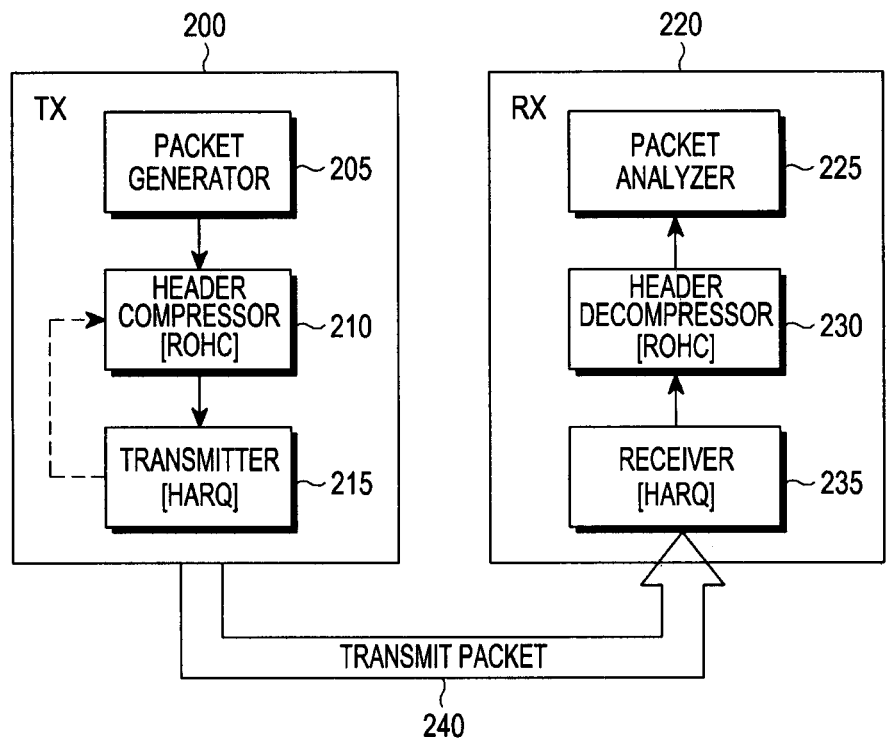
FIG. 2 is a block diagram showing a transmitter and receiver structure using header compression, according to an embodiment of the present disclosure.

FIG. 2 is a block diagram showing a transmitter and receiver structure using header compression, according to an embodiment of the present disclosure. In FIG. 2, each of a transmitting apparatus 200 and a receiving apparatus 220 may be UE 110 or a network node (for example, BS). In uplink (UL) communication, the transmitting apparatus 200 may be the UE 110, and the receiving apparatus 220 may be a BS. Meanwhile, in downlink (DL) communication, the transmitting apparatus 200 may be a BS, and the receiving apparatus 220 may be the UE 110.

Referring to FIG. 2, the transmitting apparatus 200 includes a packet generator 205, a header compressor 210, and a transmitter 215. At least one of the packet generator 205, the header compressor 210, and the transmitter 215 may be implemented as one or more processors or chipsets. The packet generator 205 may be an application processor or chipset that controls an application layer, and the packet generator 205 may generate IP packets containing user traffic. For example, in VoLTE, the packet generator 205 may generate VoIP packets, and transfer the VoIP packets to the header compressor 210.

The header compressor 210 may be an ROHC-based compressor, and may compress headers of the VoIP packets received from the packet generator 205. According to an embodiment of the present disclosure, the header compressor 210 may correspond to a Packet Data Convergence Protocol (PDCP), which is a layer of an LTE wireless protocol stack. The transmitter 215 may correspond to a transport layer to include the header-compressed packets (that is, the header-compressed VoIP packets) or a reference packet received from the header compressor 210 in a radio signal, according to a predetermined communication protocol, and transmit the radio signal through a radio link 240. The transport layer of the wireless protocol stack ensures the reliable arrival of data and provides error checking mechanisms and data flow controls. The transmitter 215 may control HARQ processing and operation of a radio link control layer and a physical layer.

The radio signal including the VoIP packets may arrive at the receiving apparatus 220 through the radio link 240.

The receiving apparatus 220 includes a receiver 235, a header decompressor 230, and a packet analyzer 225. The receiver 235 may process the radio signal received through the radio link 240 to extract data packets, and then transfer the data packets to the header decompressor 230. The header decompressor 230 may be an ROHC-based decompressor, and the header decompressor 230 may check the format of each received data packet to determine whether the received data packet includes a compressed header, and if determining that the received data packet includes a compressed header, restore the original full header. The header decompressor 230 may then add context of the restored header to a payload of the received data packet to thereby restore the original VoIP packet. The restored VoIP packet may be transferred to the packet analyzer 225. The packet analyzer 225 may correspond to the packet generator 205 of the transmitting apparatus 200 to extract user traffic from the received VoIP packet and process the user traffic.

The VoIP packet may include an IP header, a UDP header, and an RTP header, collectively called an IP/UDP/RTP header. The IP header generally includes residual static information. Internet protocol version 4 (IPv4) and internet protocol version 6 (IPv6) represent formats of an Internet header.

Hereinafter, information fields that may be included in the IP header will be described.

"header length" represents the length of the Internet header, and indicates a start of data. "type of service" is information representing the desired QoS in view of delay, reliability and throughput. "total length" represents the length of the packet (that is, the header and data) measured in units of octets. "packet identifier" represents an identifier allocated by a transmitting node to assemble fragments of datagrams. The first bit (reserved) of three flags, each allocated 1 bit, may be set to 0, the second bit DF may be a flag representing whether it is a fragment, and the third bit MF may be a flag representing whether it is a final fragment. "fragment offset" represents which position of the datagram the corresponding fragment belongs to. "time to live (TTL)" represents a maximum time for which the corresponding datagram may live. "protocol identifier" represents a protocol (for example, TCP) that is used in a data part of the datagram. "header checksum" is error-correction information of the header. "source address" and "destination address" represent IP address of a source and an IP address of a destination, respectively. Variable information among the above-mentioned information fields, that is, dynamic information may be the "total length", "packet identifier", and "header checksum".

Hereinafter, information fields that may be included in the TCP header will be described.

"source port" and "destination port" represent a port number of the source and a port number of the destination, respectively. "sequence number" represents a sequence number of a first data octet. "acknowledge number" represents a number of the next sequence which a transmitting node expects to receive. "data offset" represents the length of the header. A standardized TCP acknowledgement (ACK) may further include control bits that are used to determine a type of acknowledgement. The meanings of the control bits are as follows:

URG (urgent pointer): represents validity of an urgent pointer field.

ACK (acknowledge): represents whether the packet configures an acknowledgement.

PSH (push): represents whether a "push" function has been required.

RST (reset): represents whether a connection reset has been required.

SYN (synchronization): synchronizing sequence numbers.

FIN (final): represents that the transmitting node has no data to be transmitted.

"window size" represents a maximum size of a sequence number that the transmitting node may accommodate. "TCP checksum" represents a checksum of the header and data. "urgent pointer" represents a sequence number of successive urgent data. Dynamic information of the above-described TCP header fields is the remaining portion except for the source and destination ports, the data offset, and some of the control bits.

The header compressor 210 (hereinafter, a compressor) and the header decompressor 230 (hereinafter, a decompressor) may control processing of packets according to the ROHC. According to the ROHC, the compressor may have one of three states, that is, an initial and refresh (IR) state, a first order (FO) state, and a second order (SO) state. The IR state may be a state when the compressor is generated or reset. In the IR state, an uncompressed header, that is, a full header may be transmitted. Packets that are transmitted in the IR state will be referred to as IR packets. In other words, IR packets may be used to transmit the static part of header context when the compressor operates in the IR state.

In the FO state, the compressor may recognize and store static fields, such as an IP address, a port number, etc. Also, in the FO state, the compressor may transmit difference values of dynamic fields. That is, the FO state is a state in which static fields are compressed and dynamic fields are partially compressed. Initialization refresh-dynamic part (IR-DYN) packets may be used to transmit dynamic parts in the FO state. In the SO state, the compressor may compress all dynamic fields such as an RTP sequence number, and transmit a partial checksum to verify a logical sequence number and the next packet. Generally, in the FO state, all static fields and most of the dynamic fields may be compressed, and in the SO state, all dynamic fields may be predictively compressed using a sequence number and a checksum.

The ROHC may provide three operation modes of unidirectional mode (U mode), bidirectional optimistic mode (O mode), and bidirectional reliable mode (R mode). The compressor and the decompressor both may start in the U mode. In the U mode, packets may be transmitted in a direction from the compressor toward the decompressor, and the decompressor may transmit no feedback to the compressor. In order to process restoration errors, the compressor may transmit an IR-DYN packet to periodically refresh packets being transmitted to the decompressor.

When a feedback channel is used, and the decompressor has transmitted an acknowledgement to the compressor, the compressor and the decompressor may transition to the O mode. In the O mode, the feedback channel may be used in order to transmit an error restoration request. The O mode may have the characteristic of intermittently using the feedback channel while maximizing compression efficiency. The R mode may be used to maintain context synchronization between the compressor and the decompressor. The R mode may support more frequent feedback transmission in order to ensure reliable compression and decompression.

In the U mode or the O mode, there is no feedback or there is a delay until feedback is received. The compressor cannot detect any packet drop in the lower layer, and may change its state according to the optimistic approach of the ROHC. If packet drop occurs in the lower layer during VoIP communication, or if a block error rate (BLER) of the radio link is high, a decompression of a packet is failed, the packet failed in the decompression may be dropped. In this case, if the decompressor operates in the U mode of the ROHC, the decompressor may send no feedback for the dropped packet to the compressor. Also, if the decompressor loses context containing user traffic due to packet drop occurring in the transmitting apparatus, all the successive packets may be discarded. A method in which the decompressor may restore the context of the dropped packet is only to receive an IR packet or an IR-DYN packet from the compressor.

In the U mode, the compressor may transition to the IR state or the FO state after an IR or FO timer expires. Since the IR or FO timer may be set to a value greater than an RTP timeout value, RTP timeout may occur before the IR or FO timer expires. In this case, an RTP-based call may terminate due to the RTP timeout.

Figure 3:
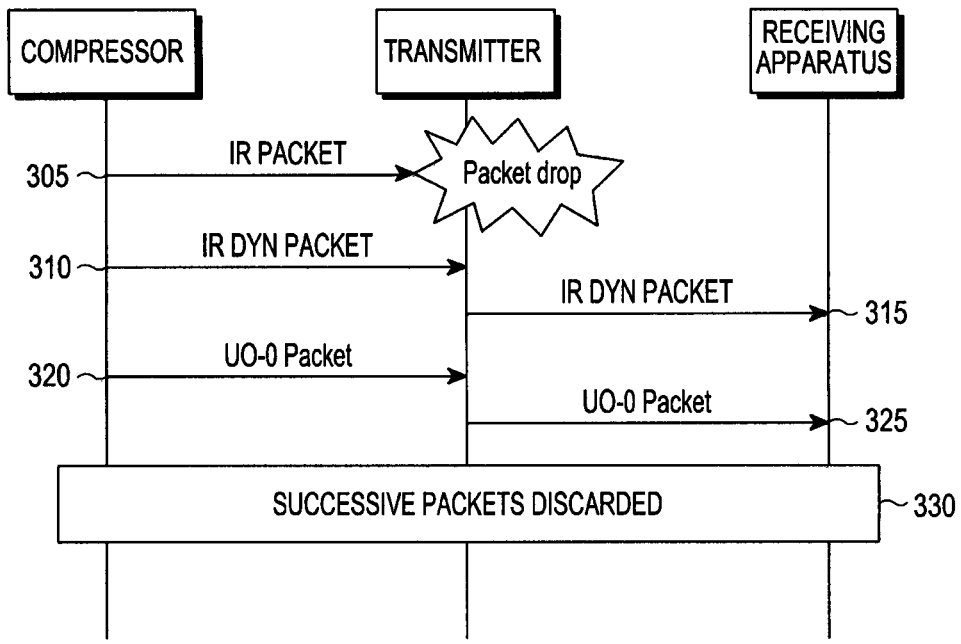
FIG. 3 is a flow diagram illustrating a procedure in which real-time transport protocol (RTP) timeout occurs due to packet drop, according to an embodiment of the present disclosure.

FIG. 3 is a flow diagram illustrating a procedure in which RTP timeout occurs due to packet drop, according to an embodiment of the present disclosure. In FIG. 3, a compressor and a transmitter may be included in a transmitting apparatus, and a receiving apparatus may include a decompressor.

Referring to FIG. 3, in step 305, the compressor applies a header compression protocol to a VoIP packet received from the upper layer (that is, a packet generator) to generate an IR packet or header-compressed packets. In step 305, an example in which an IR packet is generated is shown. The IR packet may be dropped in the transmitter due to various reasons.

For example, if the IR packet is allocated no resources for transmitting the IR packet, in other words, if there is no uplink resource grant, the transmitter may discard the IR packet without transmitting it. As another example, if no HARQ ACK is received from the receiving apparatus even after the IR packet is retransmitted by a maximum number of retransmissions of HARQ transmission from the transmitter, the IR packet may be discarded. As still another example, when the radio link is in a very bad condition, that is, when BLER is high, the IR packet may be dropped without being transmitted.

If the compressor and the decompressor operate in the U mode, the decompressor may not transmit any feedback although the IR packet is dropped. Accordingly, the compressor may not recognize the fact that the IR packet has been dropped in the transmitter, and transmits an IR-DYN packet in step 310 to the transmitter which then transmits the IR-DYN packet to the receiving apparatus in step 315.

If the compressor and the decompressor operate in the O mode, the decompressor may transmit a NACK feedback with respect to the IR packet, however, the NACK feedback may be delayed due to various reasons, such as a bad condition of the radio link, high BLER, etc. Accordingly, the compressor may transmit the IR-DYN packet before a NACK feedback is received from the decompressor. The IR-DYN packet may include difference values from the IR packet, instead of including all header fields of the IP packet. Accordingly, although the IR-DYN packet is successfully received by the receiving apparatus without being dropped, the decompressor of the receiving apparatus cannot restore the header of the IR-DYN packet due to the decompressor having no header fields of the IR packet which is a reference packet required for restoring the IR-DYN packet.

In step 320, the compressor may transmit the next packet, for example, an UO-0 packet, without recognizing the fact that the IR packet has been dropped. The UO-0 packet may be acquired by compressing the IP/UDP/RTP header, and may be transmitted in the U mode or the O mode. However, in step 325, the decompressor cannot also restore the header of the UO-0 packet, and accordingly, the IR-DYN packet and the UO-0 packet may be discarded in the receiving apparatus. In step 330, all successive packets after the IR packet are discarded in the receiving apparatus, and since no feedback will be transmitted when the receiving apparatus operates in the U mode, RTP timeout may occur in the receiving apparatus, resulting in call termination.

Meanwhile, reducing the value of the IR or FO timer in order to prevent call termination due to RTP timeout may cause the compressor to frequently transition to the IR or FO state, resulting in reduction of the compression ratio. Accordingly, a method for causing the compressor to transition to the IR state to transmit an IR packet without causing a reduction of compression ratio is needed.

In the O mode of ROHC, feedback may be provided to the compressor; however, a similar problem to that occurring in the U mode may occur if the feedback is dropped or delayed due to high BLER. In this case, the compressor may need to transition to the IR state regardless of whether feedback is received, instead of waiting for feedback transmission from the decompressor.

According to an embodiment of the present disclosure, the compressor may transition to the IR state when determining that at least one of the following conditions is satisfied.

a. When a predetermined number n of packets are dropped in the lower layer of ROHC, or when n packets or more are successively dropped.

b. When BLER is greater than a predetermined value m.

Figure 4:
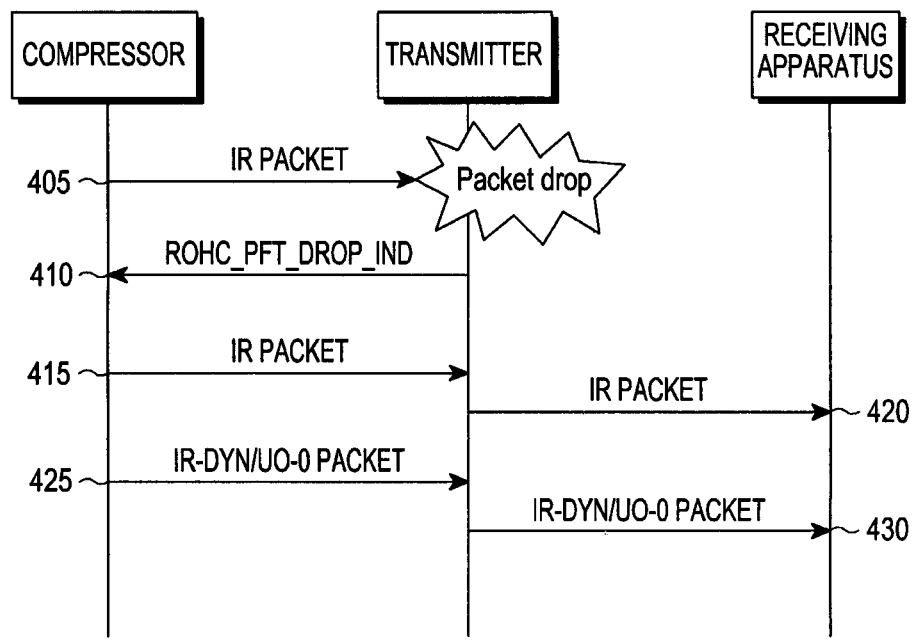
FIG. 4 is a flow diagram illustrating a procedure for transmitting an inquiry response packet when packet drop occurs, according to an embodiment of the present disclosure.

FIG. 4 is a flow diagram illustrating a procedure for transmitting an IR packet when packet drop occurs, according to an embodiment of the present disclosure. In FIG. 4, a compressor and a transmitter may be included in a transmitting apparatus, and a receiving apparatus may include a header decompressor.

Referring to FIG. 4, in step 405, the compressor applies a header compression protocol to a VoIP packet received from the upper layer (that is, a packet generator) in the U mode or O mode to generate an IR packet or header-compressed packet having the same context as the VoIP packet. In step 405 an IR packet having a full header not compressed is generated. The IR packet may be dropped in the transmitter due to various reasons.

For example, if the IR packet is allocated no resources for transmitting the IR packet, in other words, if there is no uplink resource grant, the transmitter may decide to discard the IR packet. As another example, if no HARQ ACK is received from the receiving apparatus even after the IR packet is retransmitted by a maximum number of retransmission of HARQ transmission from the transmitter, the IR packet may be processed as dropped. As still another example, when the radio link is in a very bad condition, that is, when BLER is greater than a predetermined value m, the IR packet may be processed as dropped. The dropped IR packet may be discarded or deleted by the transmitter. If the packet (for example, the IR packet) transmitted from the compressor is dropped, in step 410 the transmitter transmits a packet drop indicator ROHC_PKT_DROP_IND to the compressor. According to an embodiment of the present disclosure, the packet drop indicator ROHC_PKT_DROP_IND may be transmitted in the form of a primitive between processes.

In step 415, the compressor returns to the IR state in response to the packet drop indicator ROHC_PKT_DROP_IND, and again generate an IR packet, and then transfer the IR packet to the transmitter. The IR packet may include an uncompressed header and real-time traffic. In step 420, if the IR packet is successfully received by the receiving apparatus, the receiving apparatus may acquire header field values required for restoring the header from the IR packet, and restore the acquired header field values.

In step 425, the compressor generates the next packet, for example, an IR-DYN packet or an UO-0 packet, and transfers the IR-DYN packet or the UO-0 packet to the transmitter. In step 430, the IR-DYN packet or the UO-0 packet arrives at the receiving apparatus through the radio link. The decompressor in the receiving apparatus may restore header fields of the successive packets, as well as the IR-DYN packet or the UO-0 packet, with reference to the stored header field values.

In step 405, if the compressor and the decompressor operate in the U mode, the decompressor may transmit no feedback when the IR packet has been dropped. The compressor may transition to the upper state (the FO state or the SO state) according to the optimistic approach of the ROHC. Also, when the compressor and the decompressor operate in the O mode, the decompressor may transmit a NACK feedback with respect to the IR packet, however, the NACK feedback may be delayed due to a bad condition of the radio link or high BLER. In this case, the compressor may transit to the IR state, instead of waiting for feedback from the decompressor.

Figure 5:
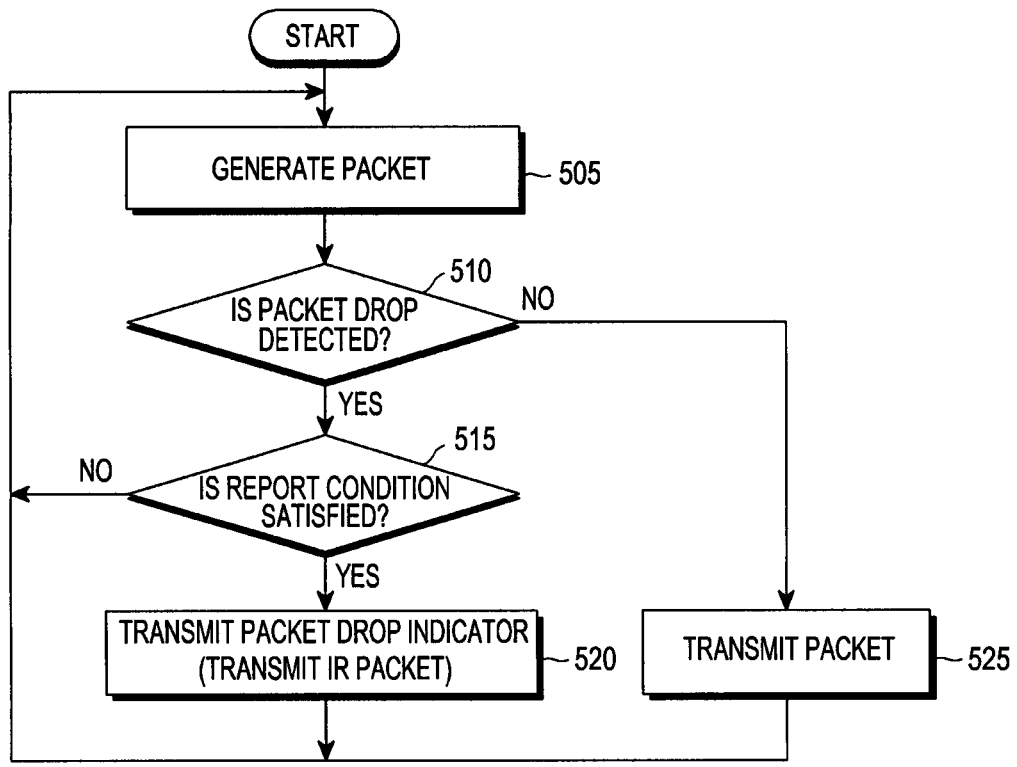
FIG. 5 is a flowchart illustrating a communication procedure for compensating for packet drop, according to an embodiment of the present disclosure.

FIG. 5 is a flowchart illustrating a communication procedure for compensating for packet drop, according to an embodiment of the present disclosure.

Referring to FIG. 5, in step 505, a transmitting apparatus applies a header compression protocol to generate a packet to be transmitted. The packet may be a VoIP packet having an IP/UDP/RTP header. In step 510, the transmitting apparatus determines whether the VoIP packet is dropped after header compression. For example, if the IR packet is allocated no transmission resources, or if the radio link is in a very bad condition, the transmitting apparatus may determine that the VoIP packet is dropped. If no packet drop occurs, the VoIP packet is transmitted to the receiving apparatus through the radio link, in step 525.

If packet drop occurs, in step 515, the transmitting apparatus determines whether the state of header compression needs to be initialized due to packet drop. For example, if it is determined that a predetermined number n of packets or more are dropped in the HARQ layer or the physical layer or that BLER is greater than a predetermined value m, the transmitting apparatus may determine that the state of header compression needs to be initialized.

If the transmitting apparatus determines that the state of header compression does not need to be initialized, for example, if the number of dropped packets is less than the predetermined number n, or if BLER is less than or equal to the predetermined value m, the transmitting apparatus returns to step 505 to continuously process the successive packets. Meanwhile, if the transmitting apparatus determines that the state of header compression needs to be initialized, in step 520, a primitive indicating packet drop may be transmitted from the RLC layer, the HARQ layer, or the physical layer in the transmitting apparatus to a layer that controls the ROHC, and the layer that controls the ROHC may transition to its initial state to transmit an uncompressed header packet. That is, in step 520, the compressor may transition to the IR state to transmit an IR packet. If a predetermined condition is satisfied after the IR packet is transmitted, the compressor may transition to the FO state or the SO state to transmit an IR-DYN packet or an UO-0 packet.

The above-described embodiments of the present disclosure may be embodied as computer readable codes in computer readable recording medium. The non-transitory computer-readable recording medium is any data storage device that may store data that is readable by a computer system. Examples of the computer readable recording medium include Read Only Memory (ROM), Random Access Memory (RAM), Compact Disk-Read Only Memory (CD-ROM), magnetic tape, floppy disk, optical data storage devices, and carrier waves (for example, data transmission over the Internet). In addition, the computer-readable recording medium may be distributed to the computer systems connected over the network, and accordingly, the computer-readable codes may be stored and executed in a distributed manner. Also, functional programs, codes, and code segments for achieving the embodiments of the present disclosure may be easily interpreted by programmers skilled in the technical fields to which the present disclosure is applied.

The apparatus and method according to various embodiments of the present disclosure may be implemented in the form of hardware, software, or a combination of hardware and software. The software may be stored in a volatile or non-volatile memory device such as, for example, a ROM, regardless of whether it is erasable or re-writable, in a memory such as a RAM, a memory chip, and an Integrated Circuit (IC), or in an optically/magnetically recordable machine (for example, a computer-readable storage medium such as a Compact Disk (CD), a Digital Versatile Disk (DVD), a magnetic disk, and a magnetic tape). The apparatus and method according to various embodiments of the present disclosure may be implemented as a computer or mobile terminal including a controller and a memory, and the memory is an example of a machine-readable storage medium suitable to store one or more programs, including instructions implementing the embodiments of the present disclosure.

Therefore, the embodiments of the present disclosure include programs including codes for implementing the apparatus and methods as set forth in the appended claims of the specification, and a machine (e.g., a computer)-readable storage medium storing the programs. The programs may be electronically transferred through any media and equivalents thereof, such as communication signals, which are transferred through wired or wireless connections.

The apparatus according to embodiments of the present disclosure may receive and store the programs from a program providing apparatus connected in a wired/wireless fashion. The program providing apparatus may include a memory for storing a program including instructions for instructing a program processing apparatus to perform a predetermined content protection method, and information, etc. needed for the content protection method, a communication unit for performing the wired/wireless communication with the apparatus, and a controller for transmitting the program to the apparatus according to a request from the apparatus or automatically.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A packet communication method using header compression, comprising:
    applying a header compression protocol to generate a packet;
    determining whether the packet is dropped in a transport layer;
    transmitting, if it is determined that the packet is dropped, a full packet having an uncompressed header;
    transmitting a packet drop indicator to a compressor that controls the header compression protocol; and
    if the packet drop indicator is received while the compressor operates in a unidirectional (U) mode or in a bidirectional optimistic (O) mode, transitioning the compressor to an initial and refresh (IR) state.

2. The packet communication method according to claim 1, further comprising: transitioning, if it is determined that the packet is dropped, an operation state of the header compression protocol to an initial and refresh (IR) state.

3. The packet communication method according to claim 1, wherein determining whether the packet is dropped comprises determining if a predetermined number of packets or more are dropped in the transport layer.

4. The packet communication method according to claim 1, wherein determining whether the packet is dropped comprises determining if a block error rate (BLER) value measured in the transport layer is greater than a predetermined BLER value.

5. The packet communication method according to claim 1, wherein determining whether the packet is dropped comprises determining if there is no resource allocated to transmit the packet.

6. A packet communication apparatus, comprising:
    a processor configured to apply a header compression protocol to generate a packet, determine whether the packet is dropped in a transport layer, and if it is determined that the packet is dropped, transmit a full packet having an uncompressed header; and
    a transmitter configured to transmit the full packet to a receiving apparatus,
    wherein the processor comprises:
        a transport layer configured to detect packet drop, and to generate a packet drop indicator; and
        a compressor configured to control the header compression protocol, and to be initialized in response to receiving the packet drop indicator, and
    wherein if the compressor receives the packet drop indicator while the compressor operates in a unidirectional (U) mode or a bidirectional optimistic (O) mode, the compressor transitions to an initial and refresh (IR) state.

7. The packet communication apparatus according to claim 6, wherein if the packet is dropped, the processor transitions an operation state of the header compression protocol to an initial and refresh (IR) state.

8. The packet communication apparatus according to claim 6, wherein if a predetermined number of packets or more are dropped in the transport layer, the processor is configured to determine to transmit the full packet.

9. The packet communication apparatus according to claim 6, wherein if a block error rate (BLER) value measured in the transport layer is greater than a predetermined BLER value, the processor is configured to determine to transmit the full packet.

10. The packet communication apparatus according to claim 6, wherein if there is no resource allocated to transmitting the packet, the processor is configured to determine to transmit the full packet.

11. A chipset for controlling a user equipment (UE) in a mobile communication system, the chipset configured to:
    apply a header compression protocol to generate a packet;
    determine whether the packet is dropped in a transport layer; and
    if it is determined that the packet is dropped, transmit a full packet having an uncompressed header,
    wherein if the chipset receives the packet drop indicator while the chipset operates in a unidirectional (U) mode or a bidirectional optimistic (O) mode, the chipset transitions to an initial and refresh (IR) state.

12. The chipset of claim 11, wherein the mobile communication system is at least one of long term evolution (LTE), LTE-advanced (LTE-A), code division multiple access (CDMA), wideband CDMA (WCDMA), universal mobile telecommunications system (UMTS), wireless broadband (WiBro), 4th generation (4G), pre 5th generation (pre-5G), 5th generation (5G) and global system for mobile communications (GSM).

13. The chipset of claim 11, wherein the chipset is further configured for wireless communication according to a short-range communication protocol, and wherein the short-range communication protocol is at least one of Wi-Fi, Bluetooth, near field communication (NFC), and WiFi Direct.

* * * * *